(12) United States Patent
Gibbon et al.

(10) Patent No.: US 8,719,031 B2
(45) Date of Patent: May 6, 2014

(54) DYNAMIC ACCESS TO EXTERNAL MEDIA CONTENT BASED ON SPEAKER CONTENT

(75) Inventors: David C. Gibbon, Lincroft, NJ (US); Lee Begeja, Gillette, NJ (US); Zhu Liu, Marlboro, NJ (US); Bernard S. Renger, New Providence, NJ (US); Behzad Shahraray, Holmdel, NJ (US); Eric Zavesky, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 230 days.

(21) Appl. No.: 13/163,022

(22) Filed: Jun. 17, 2011

(65) Prior Publication Data
US 2012/0323579 A1 Dec. 20, 2012

(51) Int. Cl.
*G10L 15/22* (2006.01)

(52) U.S. Cl.
USPC .......................................... 704/270; 704/251

(58) Field of Classification Search
CPC ........... G10L 15/265; G10L 2015/088; H04M 2201/40; H04M 3/2281
USPC ................................................. 704/270, 251
See application file for complete search history.

(56) References Cited

U.S. PATENT DOCUMENTS

| | | | | |
|---|---|---|---|---|
| 6,332,122 B1 * | 12/2001 | Ortega et al. | ................. | 704/270 |
| 6,516,312 B1 * | 2/2003 | Kraft et al. | .................... | 707/610 |
| 6,694,482 B1 | 2/2004 | Arellano et al. | | |
| 6,810,116 B1 * | 10/2004 | Sorensen et al. | ........ | 379/202.01 |
| 6,816,468 B1 * | 11/2004 | Cruickshank | ................. | 370/260 |
| 8,001,261 B2 * | 8/2011 | Katis et al. | ................... | 709/231 |
| 2002/0069069 A1 * | 6/2002 | Kanevsky et al. | ........... | 704/271 |
| 2002/0103647 A1 * | 8/2002 | Houplain | ...................... | 704/260 |
| 2004/0008828 A1 * | 1/2004 | Coles et al. | ................ | 379/88.01 |
| 2004/0128624 A1 | 7/2004 | Arellano et al. | | |
| 2004/0258222 A1 * | 12/2004 | Kobrosly et al. | .......... | 379/93.21 |
| 2007/0078708 A1 * | 4/2007 | Yu et al. | ........................... | 705/14 |
| 2007/0106724 A1 * | 5/2007 | Gorti et al. | .................... | 709/204 |
| 2008/0034056 A1 | 2/2008 | Renger et al. | | |
| 2008/0159503 A1 * | 7/2008 | Helbling et al. | ......... | 379/142.17 |
| 2008/0201143 A1 * | 8/2008 | Olligschlaeger et al. | ..... | 704/235 |
| 2008/0319750 A1 * | 12/2008 | Potter et al. | ................... | 704/255 |
| 2009/0106676 A1 * | 4/2009 | Brezina et al. | ................ | 715/763 |
| 2009/0198579 A1 * | 8/2009 | Lewis et al. | ..................... | 705/14 |
| 2009/0276503 A1 | 11/2009 | Renger et al. | | |
| 2009/0287685 A1 * | 11/2009 | Charnock et al. | ................. | 707/5 |
| 2009/0288007 A1 * | 11/2009 | Leacock et al. | ............... | 715/716 |
| 2009/0326939 A1 * | 12/2009 | Toner et al. | ................... | 704/235 |
| 2010/0063815 A1 * | 3/2010 | Cloran et al. | ................. | 704/235 |
| 2010/0121638 A1 * | 5/2010 | Pinson et al. | ................. | 704/235 |
| 2010/0131866 A1 * | 5/2010 | Nielsen et al. | ................ | 715/758 |
| 2010/0158213 A1 * | 6/2010 | Mikan et al. | ................ | 379/88.14 |
| 2010/0228693 A1 * | 9/2010 | Dawson et al. | ................. | 706/12 |
| 2011/0112833 A1 * | 5/2011 | Frankel et al. | ................ | 704/235 |
| 2011/0145258 A1 * | 6/2011 | Kankainen | .................... | 707/746 |
| 2011/0154209 A1 | 6/2011 | Fan et al. | | |
| 2011/0185286 A1 * | 7/2011 | Moyers et al. | ................ | 715/752 |
| 2012/0002001 A1 * | 1/2012 | Prentice | ..................... | 348/14.08 |
| 2012/0123779 A1 * | 5/2012 | Pratt et al. | ..................... | 704/235 |
| 2012/0191730 A1 * | 7/2012 | Parikh et al. | .................. | 707/754 |

* cited by examiner

*Primary Examiner* — Jialong He
(74) *Attorney, Agent, or Firm* — Greenblum & Bernstein, P.L.C.

(57) ABSTRACT

An audio conference is supplemented based on speaker content. Speaker content from at least one audio conference participant is monitored using a computer with a tangible non-transitory processor and memory. A set of words is selected from the speaker content. The selected set of words is determined to be associated with supplemental media content from at least one external source. The supplemental media content is made available to at least one audience member for the audio conference. The supplemental media content is selectively presented to the at least one audience member.

20 Claims, 6 Drawing Sheets

DYNAMIC ACCESS TO EXTERNAL MEDIA CONTENT BASED ON SPEAKER CONTENT

BACKGROUND

1. Field of the Disclosure

The present disclosure relates to audio conferences. More particularly, the present disclosure relates to supplementing speaker content from audio conferences with supplemental media from sources external to a speaker.

2. Background Information

Audio conferences may be presented to audiences live or from recordings. Examples of audio conferences include meetings at a single site, and conference calls or audio/video conferences or audio/video web meetings involving remote participants communicating over communications networks. Supplemental material for speakers and topics in audio/video conferences is sometimes prepared and made available to audiences. Examples of supplemental material include written and image material made available to participants.

DETAILED DESCRIPTION

In view of the foregoing, the present disclosure, through one or more of its various aspects, embodiments and/or specific features or sub-components, is thus intended to bring out one or more of the advantages as specifically noted below.

Figure 1:
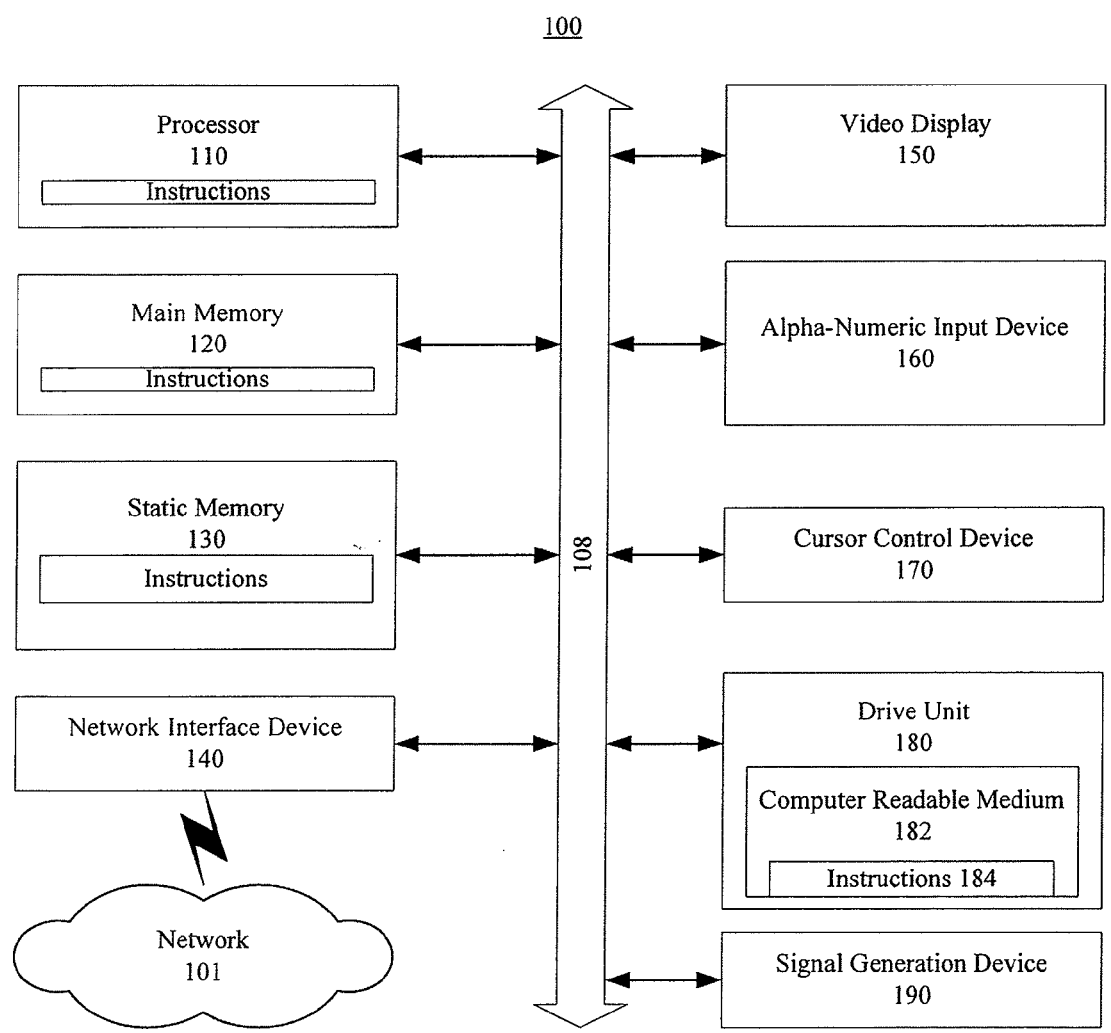
FIG. 1 shows an exemplary general computer system that includes a set of instructions for dynamic access to external media content based on speaker content described herein.

FIG. 1 is an illustrative embodiment of a general computer system that includes a set of instructions for performing processes for dynamic access to external media content based on speaker content as described herein. The general computer system is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices. For example, the computer system 100 may include or be included within any one or more of the computers, servers, bridges, devices, systems, or communication networks described herein.

In a networked deployment, the computer system may operate in the capacity of a server or as a client user computer in a server-client user network environment, or as a peer computer system in a peer-to-peer (or distributed) network environment. The computer system 100, or portions thereof, can also be implemented as or incorporated into various devices, such as a conference bridge, a monitoring server or media coordination server, an external media server, an internal media server, a personal computer (PC), a tablet PC, a set-top box (STB), a personal digital assistant (PDA), a mobile device, a palmtop computer, a laptop computer, a desktop computer, a communication device, a wireless telephone, a personal trusted device, a web appliance, or any other machine capable of executing a set of instructions (sequential or otherwise) that specify actions to be taken by that machine. In a particular embodiment, the computer system 100 can be implemented using electronic devices that provide voice, video or data communication. Further, while a single computer system 100 is illustrated, the term "system" shall also be taken to include any collection of systems or subsystems that individually or jointly execute a set, or multiple sets, of instructions to perform one or more computer functions.

As illustrated in FIG. 1, the computer system 100 may include a processor 110, for example, a central processing unit (CPU), a graphics processing unit (GPU), or both. Moreover, the computer system 100 can include a main memory 120 and a static memory 130 that can communicate with each other via a bus 108. As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an alpha-numeric input device 160, such as a keyboard, another input device (not shown), such as a remote control device having a wireless keypad, a keyboard, a microphone coupled to a speech recognition engine, a camera such as a video camera or still camera, and a cursor control device 170, such as a mouse. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g., software, can be embedded. A computer-readable medium 182 is a tangible article of manufacture, from which sets of instructions 184 can be read. Further, the instructions 184 may embody one or more of the methods or logic as described herein. In a particular embodiment, the instructions 184 may reside completely, or at least partially, within the main memory 120, the static memory 130, and/or within the processor 110 during execution by the computer system 100. The main memory 120 and the processor 110 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations, or combinations thereof.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 182 that includes instructions 184 or receives and executes instructions 184 responsive to a propagated signal; so that a device connected to a network 101 can communicate voice, video or data over the network 101. Further, the instructions 184 may be transmitted or received over the network 101 via the network interface device 140.

The present application describes mechanisms to dynamically supplement audio conferences with media content for presentation to audiences. Audio conferences as described herein are to be construed broadly to include audible communications among humans that occur at a single site or over one or more communications networks, including conference calls and audio/video conferences and audio/video web meetings. Audiences as described herein may be specified to refer solely to passive non-speaker listeners to the audio conferences but, unless so specified, will refer also to active speakers in the audio conferences.

Media content as described herein may include formatted text, drawing, audio, image and video content. Examples of media content include web pages and documents, links to web pages and documents, formatted text files, links to formatted text files, formatted drawing files, links to formatted drawing files, formatted audio content, links to formatted audio content, formatted image content, links to formatted image content, formatted video content, and links to formatted video content. Media content may also include executable computer programs or the results of executing executable computer programs. Media content may also be feedback from audience members, or may be obtained based on such feedback from audience members. In an embodiment, media content includes tallies of votes from audience members, as well as media content that is voted on by audience members or that is presented based on votes from audience members. Media content may be obtained from external public sources, internal sources of the provider of the audio conference, or even from audience members to the audio conference.

The audio conferences described herein are monitored for speaker audio content in order to determine appropriate media content to use as supplements. The speaker audio content is monitored either live or from recordings, and supplemented with media content associated with sets of one or more words in the speaker audio content. The mechanisms described in the present application are equally applicable to monitoring speaker image content or speaker video content of participants or presentations by participants in audio/video conferences and web meetings, using image recognition and analysis rather than only speaker and speech recognition. Monitoring of images or video of presenters or presentations can be used to detect and recognize content similar to the mechanisms described herein for monitoring audible speaker content. As an example, slide images (or slide content) or handwritten or typed notes presented by a participant during a conference can be monitored for content so as to obtain supplemental media content for selected content. Alternatively, images or video of a participant during a conference can be monitored for content so as to obtain supplemental media content for selected content. Such monitoring can be used to assist a vision-impaired audience member with audible explanations of a visual aid used by a participant in the audio conference.

An initial example of dynamic access to external media content based on speaker content uses a monitoring and media coordination server to monitor a conference call via a conference bridge in a communications network. As speakers present remarks to the audience via the conference bridge, the monitoring and media coordination server monitors the conference bridge and recognizes speakers with speaker identification software and speech content with speech recognition software. The monitoring and media coordination server then selects recognized sets of one or more words from the speaker content and acts to obtain media content to supplement the selected one or more words with media content.

In this and other embodiments, the monitoring and media coordination server may attempt to supplement all recognized sets of one or more words, or may attempt to supplement only isolated recognized sets of one or more words that are deemed most worthy of supplement. The monitoring and media coordination server analyzes sets of words in speaker content to find target sets to attempt to supplement. Similarly, media content, once identified, may be offered wholesale for selection to audience members, or may be selectively offered based on profiles of audience members and/or communications devices used by audience members. The monitoring and media coordination server analyzes profiles of audience members and/or audience member devices to match supplemental media content with the audience.

The media content may be dynamically located by a search of public sources, registered sources and/or private sources after the speaker content is monitored and recognized. The media content may also be identified as a match for a particular set of words before the monitoring, so that recognition of a particular set of words during monitoring may result in predetermined supplemental media content being dynamically made available to the audience.

As an example of pre-matched media content as a match for a set of words, text documents from past presentations or meetings may be tagged as a match for a particular set of words relating to a topic discussed in the past presentations or meetings. When a set of words matching the tag is recognized based on monitoring of a subsequent audio conference, the text documents from the past presentations or meetings may be dynamically identified and offered for selection to audience members to the subsequent audio conference. Therefore, a publication or other paper that may help an audience member understand a context for a particular set of words may be presented to the audience member based on dynamic monitoring of the audio conference in which the set of words is spoken. When the text documents are not pre-matched, the text documents may be identified and made available based on a dynamic search of public and/or private sources.

Whereas in one embodiment media content is identified and tagged prior to the monitored audio conference in which the set of words is monitored and detected, in another embodiment a detected set of words is used for a dynamic search of sources to find media content that might help an audience member understand context for the set of words. In either embodiment, the media content is then offered to audience members either directly or as selectable links. In this way, an audience member listening to an audio conference may be presented with supplemental media content either while listening to a live audio conference or while listening to a recorded audio conference. The supplemental media content may be offered to the audience via networks different than networks over which the speaker content is provided. For example, audience members listening to a corporate audio conference such as an earnings call via a telephony network may be presented with a real-time or near-real-time transcript and media content or links to media content over the Internet for a set of words from the speaker content. The supplemental media content may also be made available dynamically to the audience members without a transcript.

Figure 2:
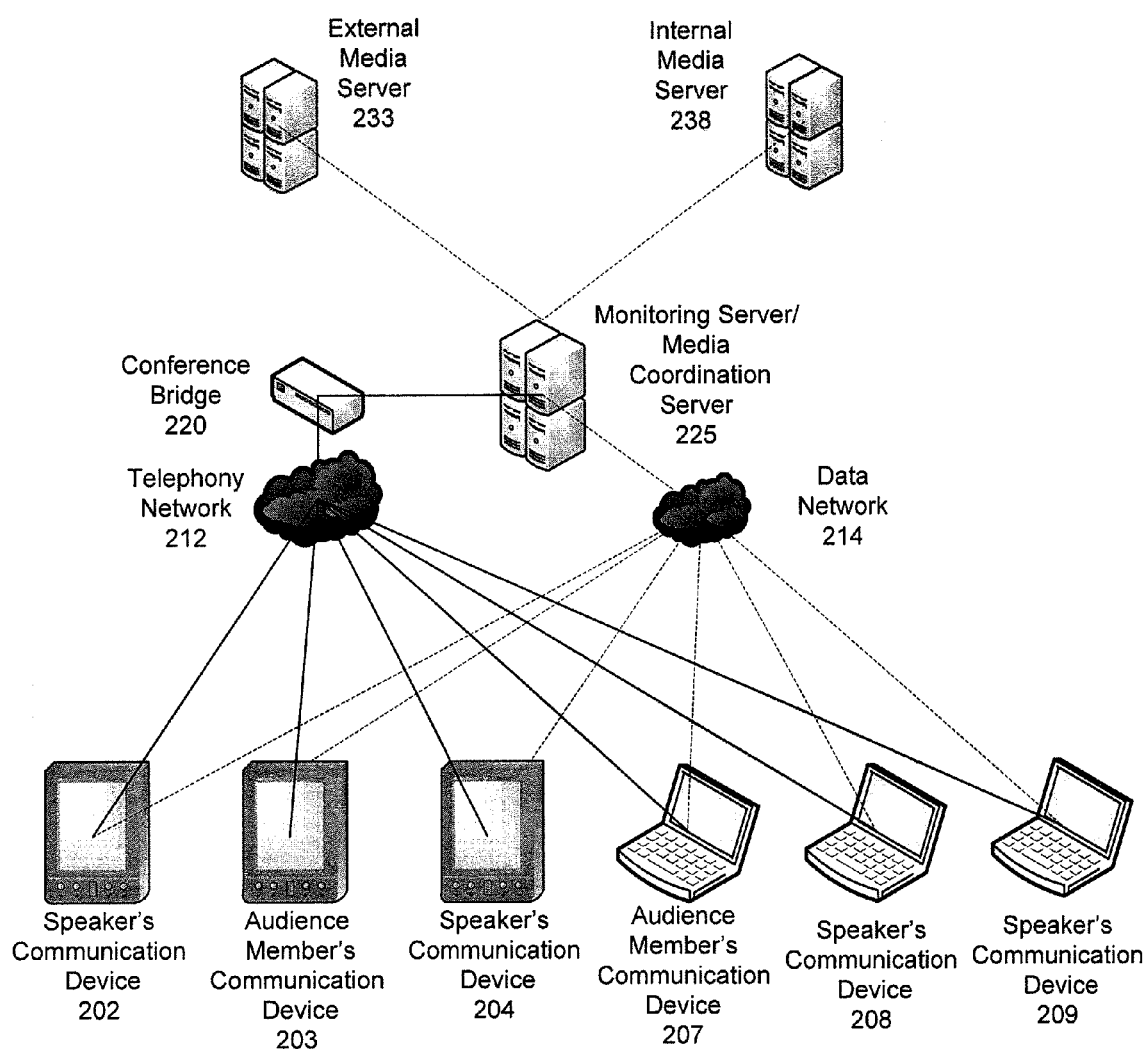
FIG. 2 shows an exemplary network for dynamic access to external media content based on speaker content described herein, according to an aspect of the present disclosure.

FIG. 2 shows an exemplary network for dynamic access to external media content based on speaker content. In FIG. 2, speaker's communication device 202 and speaker's communication device 204 are personal digital assistants, as is audience member's communication device 203. Audience member's communication device 207 is a laptop computer, as are speaker's communication device 208 and speaker's communication device 209. In FIG. 2, each of the speaker's communication devices 202, 204, 208 and 209 and audience member's communication device 203 and 207 is a dual use device that communicates via both a telephony network 212 and data network 214. However, in another embodiment, the devices 202-209 shown in FIG. 2 may also communicate using a single network such as the Internet or a cellular network, or a combination of any appropriate networks. In an embodiment, the devices 202-209 communicate via Voice over Internet Protocol (VoIP), by which voice communications are carried over a data channel. Speakers and audience members may also individually use more than one communications device, such as a telephone set to listen to an audio conference via a telephony network and a personal digital assistant to obtain supplemental media content via the Internet. Multiple speakers and audience members may also share a single communications device to, for example, listen to an audio conference or review supplemental media content.

The various speaker's communication devices 202, 204, 208 and 209 and audience member's communication devices 203, 207 participate in and/or listen to an audio conference bridged on a conference bridge 220 over a telephony network 212. The speaker content in the audio conference is monitored at the conference bridge 220 by a monitoring server/media coordination server 225. The monitoring server/media coordination server 225 recognizes speakers using speaker identification software and sets of words using speech recognition software.

Speakers can be identified in several ways. For example, if the speaker does not need to be specifically identified, speaker segmentation software can be used to distinguish different speakers. Speaker segmentation is used to distinguish between different speakers generically, whereas speaker identification specifically identifies different speakers. Speaker identification is useful, for example, when speakers are associated with individual profiles.

For speaker segmentation, users or a conference bridge administrator can label each different speaker with a label to effectively differentiate between the speakers. For speaker identification, the system can be trained to recognize each voice using dictation software. In either scenario, once the speech data is associated with an identity, speech models are built for each user to improve recognition of the words spoken by that user. That is, speaker identification software can be used for speaker identification, but this may assume that trained speech data from each user is already available so that each speaker can be identified. The more the users use the system, the more speech data will be correlated to different users using speaker identification or other methods. This increased speech data can be taken for each user and used to build improved speech models for each user so that the accuracy for speaker identification and speech recognition of the words improves.

As another alternative to speaker segmentation or speaker identification, the conference bridge may separately record each leg of a conference call, so that if only one person is dialing in for each leg, speakers can be differentiated by the legs they are speaking on. Alternatively, speakers can be differentiated by communications devices such as individual microphones they use.

The monitoring server/media coordination server 225 segments the sets of words and correlates the sets of words with the individual speakers. As noted previously, speakers can be identified from their speech, from the conference legs on which they speak, or by communications devices they use to speak. Multiple communications devices used by a single speaker, such as a personal computer and telephone may be correlated to the speaker by login information on the devices or by the speaker logging in to the conference bridge using the devices.

The server 225 may search for supplemental media content for all recognized sets of words, but may also selectively search for supplemental media content for only a subset of the recognized sets of words. For example, the monitoring server/media coordination server 225 may select a subset of words from the speaker content using an algorithm. For example, the monitoring server/media coordination server 225 may search for acronyms, or infrequently used terminology, or slang terminology, or technical or complex terminology. An algorithm may specify types of word sets that may warrant a search. The algorithm may also specify a ratio/percentage of recognized word sets that may warrant a search, such as 10%. The algorithm may classify each set of words into categories and assign weights to each set of words in order to identify those sets of words for which supplemental media content will be sought. Algorithmic software may classify sets of words into categories of information or events, such as acronyms, surnames, technical terms etc. Searches for supplemental media content can be narrowed based on categorization of the sets of words.

The monitoring server/media coordination server 225 in FIG. 2 is an analysis engine that has access to the conference bridge 220 to monitor and analyze speaker content carried over the conference bridge 220. In another embodiment, the analysis engine with the characteristics of the server 225 described herein is integrated in or a component of the conference bridge 220. The analysis engine is used to identify which sets of words to be used as the basis for a search for supplemental media content, which sources to search for supplemental media content, and which types of content to present to one or more audience members for selection. The analysis engine may also include a search engine, or may communicate with a search engine to actually perform one or more searches for the supplemental media content.

The sources from which supplemental media content may be obtained can also be tailored based on analysis of sets of words, such as categorization of a set of words into predetermined categories of, for example, acronyms or information or events. As an example, a detected acronym may be searched in an online acronym dictionary, and potential explanations of the full terminology or a link to potential explanations of the full terminology for the acronym may be returned to an audience member. Similarly, a term such as "Babe Ruth" may be searched in an online biography database, and links to one or more biographical summaries of Babe Ruth may be presented to an audience member as supplemental media content for selection. The sources for the supplemental media content may be pre-identified and dynamically searched when word sets in a particular category are detected. Alternatively, the sources for the supplemental media content may be dynamically identified and searched when word sets in a particular category are detected. As another alternative, specified sets of words and the matching supplemental media content may both be pre-identified, such that the supplemental media content is dynamically retrieved and made available when the set of words is detected in speaker content. Alternatively, a list of specified sets of words may be maintained, so that any detection of a set of words on a list results in a dynamic search for new supplemental media content to present. Monitoring server/media coordination server 225 or another analysis engine can also accept input from audience members in order to identify sets of words that warrant supplement, such as when audience members request assistance with a particular set of words during an audio conference.

The algorithm of an analysis engine can also determine which media content to present to audience members for selection. For example, profiles of audience members or communication devices used by audience members may include information that an analysis engine can use to determine which media content will be of use or interest to a particular audience member. Multiple profiles, such as an audience member's profile data from different social networking accounts, may be integrated or otherwise jointly used to determine which media content will be of use or interest to a particular audience member. Profiles from teleconference services or other communications services may also be integrated with social networking profiles. A profile for an audience member may also include data reflective of previous supplemental media content selected by the audience member for review during prior audio conferences, as well as other types of activities performed by the audience member during prior audio conferences.

A single profile may be used for a group or sub-group of multiple audience members, such as when multiple audience members belong to a group that studies or is responsible for a particular topic. In this case, items of content can be presented for selection to multiple audience members based on a common determination that the items of content will be of interest to the multiple audience members.

Audience members can also customize their own profiles to indicate interests or speakers for which supplemental media content would be desired. For example, audience members can customize their own profiles to specify that they are interested in topical information of a particular type, such as batting averages for baseball players named in an audio conference, or biographies for business or political leaders named in an audio conference. Similarly, audience members can customize their own profiles to specify that they wish for supplemental items of media content to be restricted to images or video.

Audience members can also customize their own profiles to indicate categories of information in speaker content that they do not want supplemented with supplemental media content, such as categories of information with which the audience member is familiar. As an example, an audience member may indicate familiarity with "Video on Demand", so that supplemental media content is not desired for sets of words categorized as relating to video on demand. Based on input from one or more audience members, the analysis engine may therefore not even perform a search for certain sets of words identified as relating to particular categories of information, and only perform searches of external sources for sets of words not identified as relating to these particular categories of information.

The analysis engine can use profiles to filter media content that is found in a search based on a detected set of one or more words. Therefore, the amount of media content presented to audience members can be tailored to an audience member's profile or a group profile so that the audience member is not overwhelmed or otherwise burdened with excessive information for review during an audio conference.

Profiles of communication devices can also be used so that types and amounts of media content presented to an audience member via any particular communication device are tailored to the profile of the communication device. For example, links to a full set of supplemental media content may be offered for selection on a mobile device (or smartphone), whereas thumbnail images or even whole images may be offered for selection on a personal computer. In this way, a profile of a communication device will dictate the limitations of the amounts and type of supplemental media content that is to be presented on the communication device for selection by an audience member.

In the embodiment of FIG. 2, the audio communications are provided in a conference call over a telephony network 212. However, in other embodiments, the audio communications are provided in an audio/video conference or audio/video web meeting and the communications network may be a data network such as the Internet.

The monitoring server/media coordination server 225 initiates a search or inquiry to an external media server 233 and/or internal media server 238 for supplemental media content associated with a selected set of words. The external media server 233 is configured to dynamically search media resources external to an organization that sponsors the audio conference, employs or engages the speakers in the audio conference, or provides some or all of the computing and communication resources by which the audio conference is held. The external media server 233 dynamically initiates a search of the external media resources using, for example, a search engine to search the Internet. The internal media server 238 is configured to initiate a search of private media resources internal to an organization that sponsors the audio conference, employs or engages the speakers in the audio conference, or provides some or all of the computing and communication resources by which the audio conference is held. The internal media server 238 dynamically initiates a search of the internal media resources using, for example, a search engine to search resources on an intranet. Results of the search or inquiry are returned as supplemental media content for selection to any or all of the speaker's communication devices 202, 204, 208 and 209 and/or audience member's communication devices 203, 207 via a data network 214. As noted previously herein, supplemental media content may also be pre-identified and associated with particular sets of words, so that detection of a particular set of words in monitoring an audio conference results in the pre-identified media content being dynamically retrieved and presented for selection to an audience member.

Figure 3:
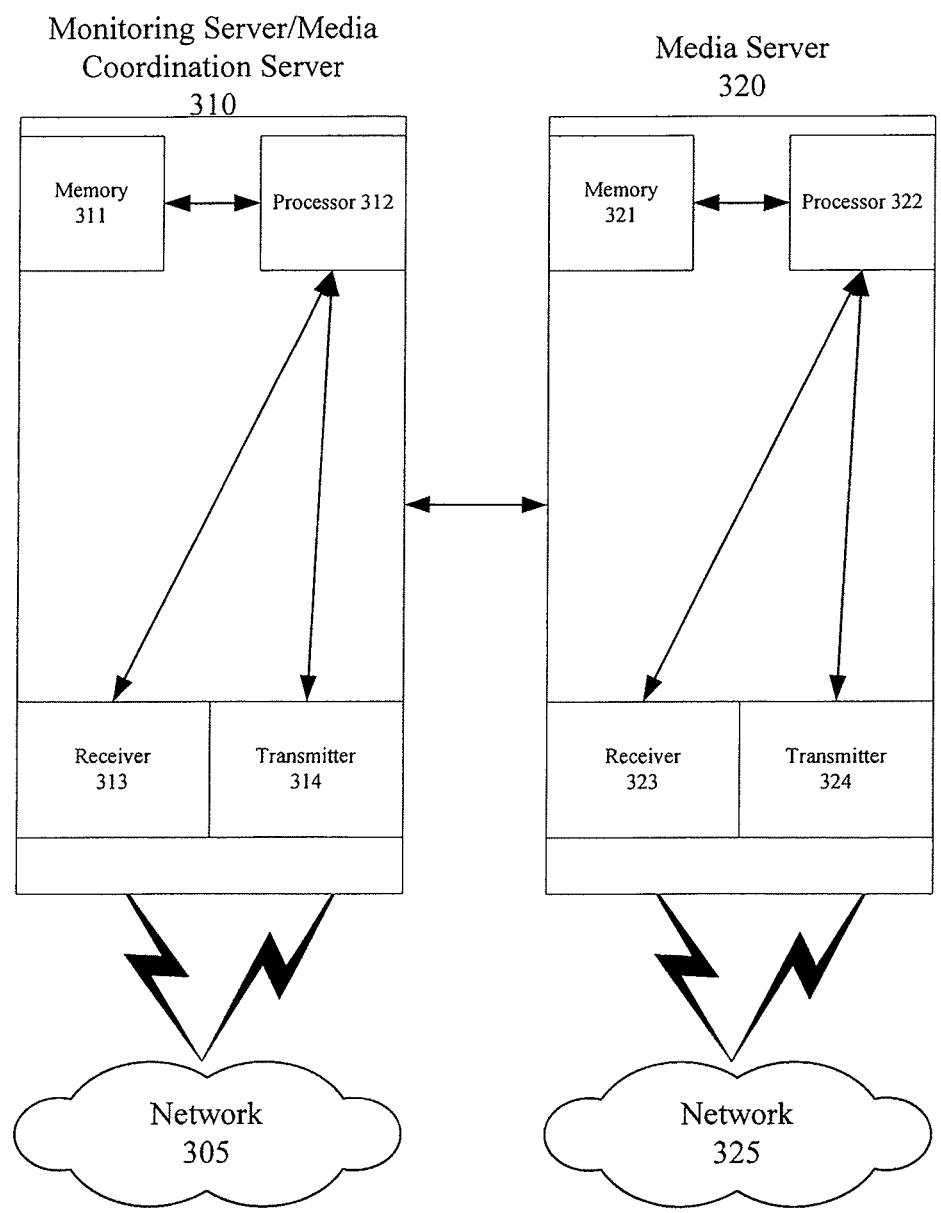
FIG. 3 shows an exemplary monitoring server/media coordination server and an exemplary media server for dynamic access to external media content based on speaker content, according to an aspect of the present disclosure.

FIG. 3 shows an exemplary monitoring server/media coordination server and an exemplary media server for dynamic access to external media content based on speaker content network. In FIG. 3, monitoring server/media coordination server 310 includes a memory 311, a processor 312, a receiver 313 and a transmitter 314. The receiver 313 and transmitter 314 communicate over network 305. The processor 312 processes instructions and data from the receiver 313 and memory 311, and forwards instructions or data to transmitter 314 for transmission or to memory 311 for storage. In FIG. 3, media server 320 includes a memory 321, a processor 322, a receiver 323 and a transmitter 324. The receiver 323 and transmitter 324 communicate over network 325. The processor 322 processes instructions and data from the receiver 323 and memory 321, and forwards instructions or data to transmitter 324 for transmission or to memory 321 for storage.

The monitoring server/media coordination server 310 and media server 320 also communicate with each other in the embodiment of FIG. 3. The servers may communicate over a communications network, or may alternatively be implemented on the same physical computer.

As an example of an application for dynamic access to external media content based on speaker content, the monitoring server/media coordination server 310 may be employed or engaged by the organization that organizes or sponsors the audio conference or employs one or more speakers in the audio conference. The monitoring server/media coordination server 310 monitors the audio conference using speaker identification software and speech recognition software. In embodiments that include a conference bridge such as conference bridge 220 in FIG. 2, the monitoring server/media coordination server 310 may also receive information from the conference bridge, and this information may indicate which of the conference participants is currently speaking. The monitoring server/media coordination server 310 may be programmed only to recognize and identify content from one or more specified speakers, or may be programmed to recognize and identify content from all speakers in the audio conference. The monitoring server/media coordination server 310 then recognizes each recognizable isolated word and the placement of each recognizable individual word in a phrase or sentence. The monitoring server/media coordination server 310 may refer to resources such as electronic dictionaries, and lists of recognized words and the number of times or relative frequency the recognized words appear in audio conferences. The monitoring server/media coordination server 310 then requests the media server 320 to perform a search of external and/or internal databases for references to the recognized words.

The media server 320 performs a search of public and/or private databases for media content that includes or is electronically tagged with the recognized sets of words. Such media content might be dictionary definitions, acronym explanations, photographs or videos, additional audio, or written transcripts. The media content or links to the media content are then provided to the monitoring server/media coordination server 310, and in turn offered to the speaker's communication devices 202, 204, 208 and 209 or Audience Member's Communication Device 203 and 207 shown in FIG. 2. The media content or links presented to speakers and other audience members may be organized by type of content, or by best match, or by exact match.

As an example, using the monitoring server/media coordination server 310 and media server 320, an Internet broadcast of a political audio conference such as a U.S. Senate hearing can be monitored, and content spoken by a particular Senator or witness can be identified and supplemented as appropriate. Particular sets of words that are identified as relevant may then be supplemented with media content from external and/or internal media sources. As an example, a witness testifying to a Senate committee about oil prices may speak the term "peak oil", and the monitoring server/media coordination server 310 may identify the term as warranting supplementary explanation. The media server 320 may then search for and retrieve content or links to charts, images, audio, or text material that can be offered to the audience via data network 214 as in FIG. 2 to help explain what is meant by the term "peak oil".

Figure 4:
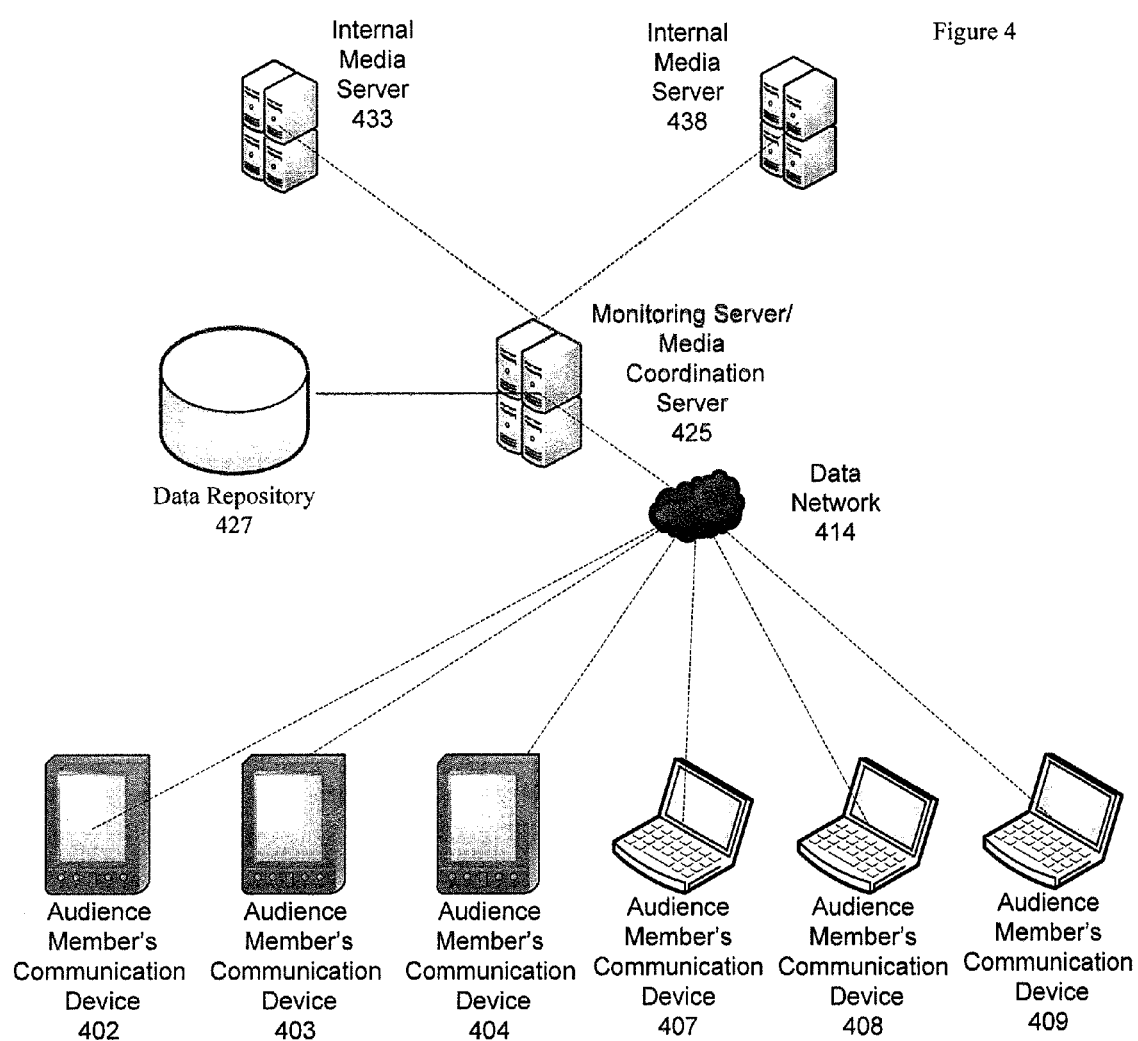
FIG. 4 shows another exemplary network for dynamic access to external media content based on speaker content described herein, according to an aspect of the present disclosure.

FIG. 4 shows another exemplary network for dynamic access to external media content based on speaker content. In the embodiment of FIG. 4, audience member's communications device 402, 403, 404, 407, 408 and 409 monitor an audio conference over data network 414. In this embodiment, the audio conference is a recording of a previous audio conference and is stored as electronic data in a data repository 427. As the recording of the audio conference from data repository 427 is played to each audience member's communications device 402, 403, 404, 407, 408 and 409, the monitoring server/media coordination server 425 monitors the recording for speaker content. The monitoring server/media coordination server 425 recognizes sets of one or more words, and identifies sets of words that might benefit from supplemental explanation. In this embodiment, the monitoring server/media coordination server 425 communicates with internal media server 433 and internal media server 438 to obtain supplemental media content to offer to audience members.

As explained above, in the embodiment of FIG. 4 a recording of an audio conference is monitored rather than a live audio conference. Further, in the embodiment of FIG. 4 the organization that provides access to the recording only searches for internal supplemental media content to provide to the audience. This embodiment could be used by an education institution that records lectures by professors, and offers supplemental material to students or other listeners as supplemental media content. Here, the supplemental media content may be supplemental content provided by the professor, or by a department or school. This embodiment could also be used by a governmental agency or professional organization that holds internal audio conferences for which dynamic access to supplemental media content might prove beneficial.

In an alternative embodiment, the internal media server 433 and/or the internal media server 438 are external media servers that dynamically search public media sources. In another embodiment, the audio conference in FIG. 4 is a live audio conference. In still another embodiment, the audio conference in FIG. 4 is a live audio conference, and the internal media server 433 and/or the internal media server 438 are external media servers that dynamically search public media sources.

As another example of how a profile can be modified based on input from audience member to improve tailoring of supplemental media content, an audience member using device 404 in FIG. 4 may monitor a recorded audio conference using the device 404. An audience member may be allowed to directly indicate interest in a portion of an audio conference, such as by replaying a particular portion of the audio conference or pausing a particular portion of the audio conference. The device 404 instructs the monitoring server/media coordination server 425 to replay or pause the audio conference. The monitoring server/media coordination server 425 may take an instruction to pause or replay or bookmark particular content as a cue to determine that supplemental media content is warranted for sets of words immediately before the replay or pause instruction.

Concentrations of the selections of supplemental media content can also be used as feedback to a presenter/participant in an audio conference to indicate particular content that might warrant additional explanation in future audio conferences involving the same topic. As an example, a speaker could update a recording of a lecture to improve clarity based on selections of supplemental media content at a particular part of an existing recording of the lecture. A speaker could also be notified that something is unclear in a live audio conference when a threshold of selections for supplemental media content is exceeded at one time.

In other embodiments, audience members may affirmatively vote on speaker content as the speaker content is presented. These votes could be used in determining whether supplemental media content from external sources should be sought, as well as in determining which audience members should be presented with supplemental media content if any is located. For example, votes from audience members may be used to determine whether to seek supplemental media content for subsequent audience members later listening to a recording of the audio conference for which the votes are collected. Additionally, similar profile data for different audience members may result in a vote of interest by one audience member resulting in supplemental media content being made available to another audience member with the similar profile data.

Which supplemental media content is actually selected by different audience members may be used to determine whether the supplemental media content is useful. For example, if only one out of ten audience members selects an item of supplemental media content to review, a monitoring and coordination server may stop retrieving the supplemental media content for subsequent audience members reviewing the same audio conference. On the other hand, if six of ten audience members select the item of supplemental media content to review, the monitoring and coordination servers may continue to offer the item for the same or similar detected sets of words that resulted in the item being initially found.

The activity of pausing, replaying or bookmarking a part of an audio conference, or voting for or even merely selecting an item of supplemental media content for review, is also used to update the audience member's profile. These activities are used to indicate that the audience member may be interested in information in information in a particular category of information. Thus, an audience member profile can include both general background information of an audience member, as well as characteristic information collected dynamically as the audience member listens to an audio conference or multiple audio conferences.

In another embodiment, an audience member may have a supervisory role over other audience members. Therefore, a supervisory audience member may be presented with supplemental media content for review before any other audience member, so that the supervisory audience member can either authorize or reject presenting the supplementary media content to other audience members. As an example, a supervisor using audience member's communication device 409 may be presented with an item of media content. The supervisor may determine that the item does not adequately provide background information for an associated set of words that triggered the search that resulted in the item of media content being presented. In this instance, the supervisor may accept or reject the item of media content so that other audience members are or are not presented with the option of reviewing the item of media content.

The supervisory role may also be provided by the monitoring server/media coordination server 425. The server 425 may recognize a set of words and determine based on historical statistics that the recognized set of words is not important or unusual enough to warrant a search of sources for supplemental media content. The server 425 may also operate as an analysis engine that analyzes items of supplemental media information to determine the relevance to a set of words that was used as the basis of the search by which the items were discovered.

In another embodiment, the audience member's communication devices 402-409 in FIG. 4 are gaming devices used by individuals playing an interactive game on the Internet. In this example, the monitoring server/media coordination server 425 monitors speech from each of the players, to determine if supplemental media content would be appropriate. The server 425 can serve as a translation service in the instance where the individuals speak different language, so that quick translations can be offered to players for sets of words in different languages. The server 425 may also serve to transcribe audio conferences such as conference calls or interactive online games.

Figure 5:
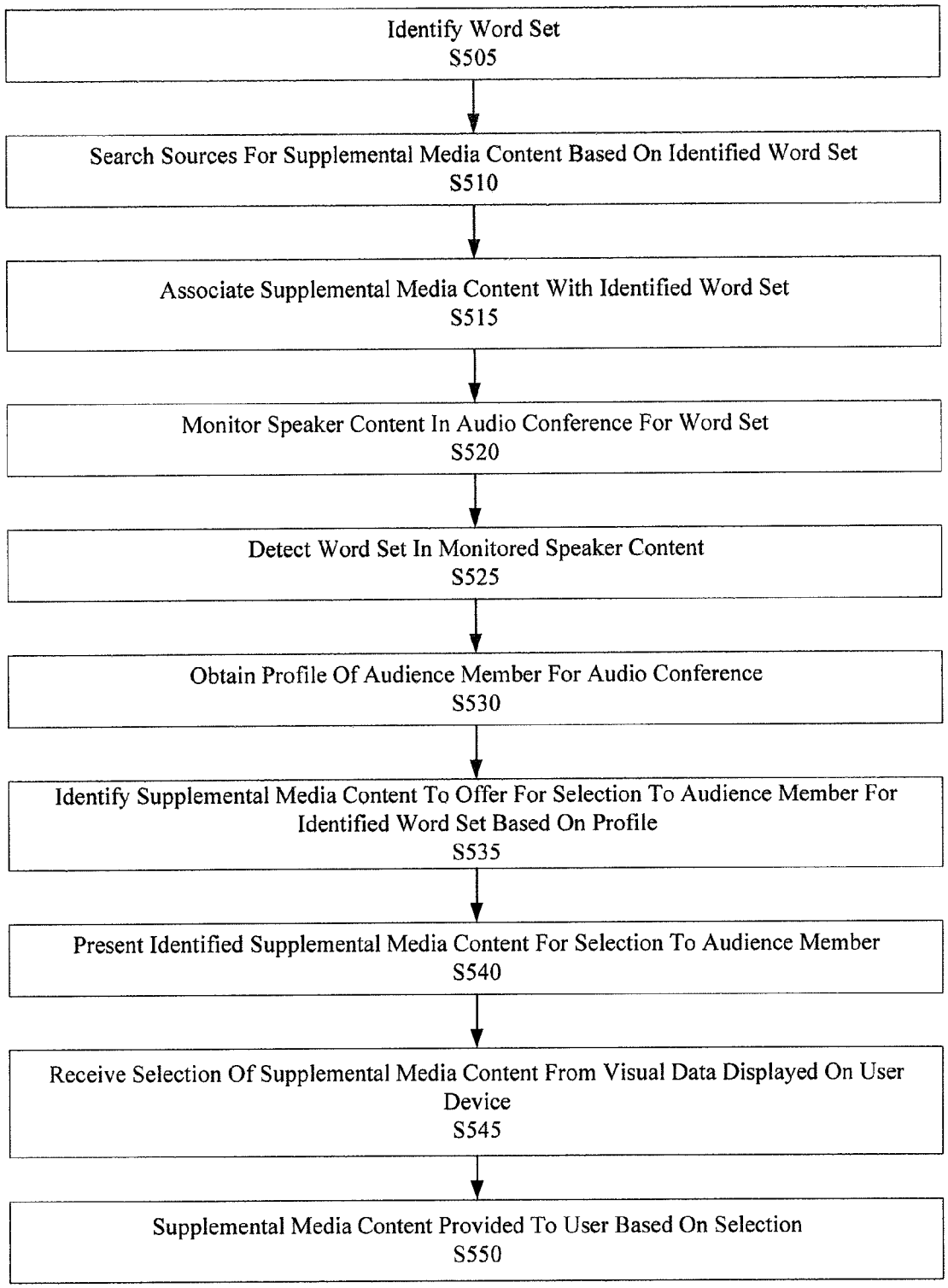
FIG. 5 shows an exemplary process for dynamic access to external media content based on speaker content, according to an aspect of the present disclosure.

FIG. 5 shows an exemplary process for dynamic access to external media content based on speaker content. At S505, a word set is identified. At S510, sources for supplemental media content are searched based on identified word sets. At S515, supplemental media content is associated with the identified word set. At S520, speaker content in an audio conference is monitored for the word set. At S525, the word set is detected in monitored speaker content. At S530, profiles of audience members for the audio conference are obtained. At S535, supplemental media content to offer for selection to an audience member for the identified word set is identified based on a profile of the speaker or a communication device used by the speaker. At S540, identified supplemental media content is presented for selection to the audience member. At S545 a selection of supplemental media content is received based on visual data displayed on a user's device such as the audience member's communication devices described herein. In another embodiment, a selection of supplemental media content may be received based on audio data output by a user's device. At S550, a selection received from a user leads to the supplemental media content being selected by the user.

Audience members may also be allowed to contribute supplemental media content for an audio conference. For example, audience members may be able to add comments as annotations to a recorded stream. Feedback from audience member annotations or notes or supplemental media content selected by an audience member may even be given to audio conference participants to help improve future presentations. In an embodiment, an authorized audience member may even correct content presented in an audio conference, such as by correcting a factual or typographical error in written materials.

The embodiments described herein mainly describe audio conferences across communications networks. However, in an embodiment, the audio conference is a live audio conference at a single site among multiple participants and passive listeners. For example, a monitoring computer at the site may listen as a group watches a sports event. When a member of the group talks, the monitoring computer may select sets of words and determine whether to offer supplemental media content based on the sets of words. In this way, the monitoring computer may obtain supplemental audio and/or audio video for selection to the audience. As an example of this embodiment, a computer may be placed in a booth at a sporting establishment where participants are watching an NFL game involving the Chicago Bears. When an audience member utters the word "Payton", the computer may obtain reference video of Walter Payton in past events, and offer to display such videos for the audience. Alternatively, the computer may obtain a biography of Walter Payton, or statistics involving Walter Payton's career, and offer to display such information for the audience.

Another example of an audio conference at a single site would be a conference or a classroom where a lecturer presents audio content that is monitored and analyzed in order to provide supplemental media content to audience members such as students. In such an environment, audience members could be provided with supplemental media content from external sources, and the supplemental media content can be tailored to individual audience members based on their profiles or the profiles of their communication devices. In this way, students who speak different primary languages may be provided with supplemental media content in their own languages.

Figure 6:
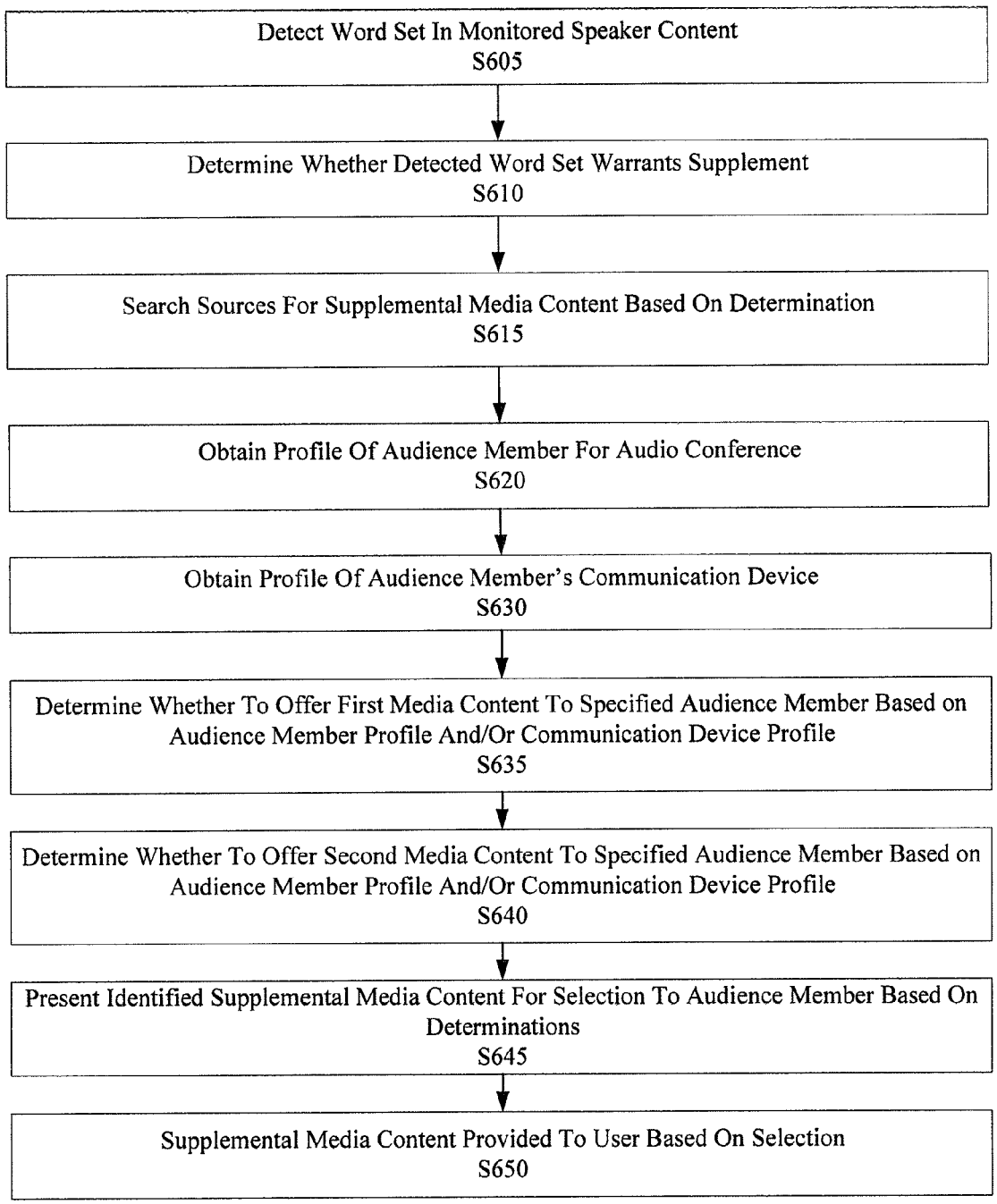
FIG. 6 shows another exemplary process for dynamic access to external media content based on speaker content, according to an aspect of the present disclosure.

FIG. 6 shows another exemplary process for dynamic access to external media content based on speaker content. In the embodiment of FIG. 6, each detected word set in speaker content is analyzed to determine whether the detected word set warrants supplement with external media content. Also in the embodiment of FIG. 6, sources are newly searched for supplemental media content after the word sets are detected. Additionally in the embodiment of FIG. 6, different media content is offered for selection to one or more audience members based on a profile of the audience member or a profile of the audience member's communication device.

In FIG. 6, a word set in monitored speaker content is detected at S605. At S610, a determination is made whether the detected word set warrants supplement with external media content. For example, each detected word set may be assigned a weighted value based on, for example, whether the word set is or includes an acronym or uncommon technical word. Sources may be searched for supplemental media content only for the detected word sets determined to have the highest weighted values. The search of sources for supplemental media content is performed at S615. A profile of an audience member is obtained at S620, and a profile of the audience member's communication device is obtained at S630. At S635, a determination is made whether to offer first media content to the profiled audience member based on the audience member's profile and/or the communication device's profile. At S640, a determination is made whether to offer second media content to the profiled audience member based on the audience member's profile and/or the communication device's profile. Based on the determinations at S635 and S640, the first and/or second media content is presented to the audience member for selection at S645, and at S650 the supplemental media content is provided to the user based on the selection of the user.

Audience member profiles can include connections with other audience members, based on membership in the same group or sub-group or based on background information of the audience member such as common employer. Membership in a group or sub-group may be established simply by expertise in a certain subject. Audience members can then be profiled as belonging to certain peer groups and sub-groups, so that sets of words are selected for supplementing for the group or sub-group as a whole. Similarly, profiles of groups and sub-groups of audience members can be used to identify items of supplemental media content to offer to the group or sub-group as a whole. Therefore, audience members in the same group or sub-group can be offered the same or similar supplemental media content for review, even when the audience members are listening to the audio conference at different times.

As described above, profiles of audience members and even audience members' communication devices may be used to determine which sets of words in an audio conference warrant supplementing with supplemental media content. In this way, a secondary profile engine on audience members' communication devices can help identify which sets of words in an audio conference should be used as the basis for a search of sources for external media content. Similarly, the profile of an audience member or an audience member's communication device can be used by a monitoring server/media coordination server or the audience member's communication device to filter which external media content to present. In this way, multiple layers of filtering can be used to reduce the amount and type of supplemental media content that is offered.

Although the disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular means, materials and embodiments, the disclosure is not intended to be limited to the particulars disclosed; rather the disclosure extends to all functionally equivalent structures, methods, and uses such as are within the scope of the appended claims.

As described above, a method for supplementing an audio conference based on speaker content is provided according to an aspect of the present disclosure. A computer with a tangible non-transitory processor and memory monitors speaker content from at least one audio conference participant. A set of words from the speaker content is selected. The selected set of words is determined to be associated with supplemental media content from at least one external source. The supplemental media content is made available to at least one audience member for the audio conference. The supplemental media content is selectively presented to the at least one audience member. The method may include selecting external sources to search for supplemental media content. The method may also include selecting supplemental media content to present for selection to an audience member.

The speaker content is monitored as the audio conference is played live or from a recording in order to dynamically analyze the speaker content, dynamically selected sources to search, and/or dynamically select items of media content to present. Supplemental media content is retrieved for selected sets of one or more words. In an embodiment, speaker content may also be monitored before an audio conference, such as when a transcript of prepared remarks and notes is made available for monitoring. Based on the sets of words in the speaker content, a search is performed for supplemental media content to make available to audience members. As noted herein, an item of supplemental media content may have been pre-identified and associated with a set of one or more words prior to the search, or the search based on the monitoring may be a new query for supplemental media content that has not been previously associated with the set of words.

According to another aspect of the present disclosure, making the supplemental media content available includes presenting an option to select the supplemental media content available to the at least one audience member for the audio conference. The supplemental media content is selectively presented to the at least one audience member responsive to selection of the supplemental media content by the at least one audience member.

According to yet another aspect of the present disclosure, the audio conference includes a discussion at a single physical site among multiple individuals. In an embodiment, the discussion is monitored by a single device that determines when to search for supplemental media content to supplement a part of the discussion.

According to still another aspect of the present disclosure, one of the at least one audience member is the speaker. In an embodiment, the speaker is presented with supplemental media content based on a set of words in the speaker's content, or in another speaker's content. This supplemental media content may also include items of content provided by other audience members.

According to another aspect of the present disclosure, the supplemental media content includes feedback accepted from one of the at least one audience member. In an embodiment, the feedback is a vote by an audience member for a particular portion of an audio conference.

According to yet another aspect of the present disclosure, feedback is accepted from one of the at least one audience member. The supplemental media content is made available to the at least one audience member based on the feedback.

According to still another aspect of the present disclosure, the set of words includes a single word.

According to another aspect of the present disclosure, the selected set of words is associated with the supplemental media content prior to the audio conference, and dynamically retrieved during the audio conference. Upon detection of a specified set of words, the supplemental media content is retrieved and presented for selection to one or more audience members.

According to yet another aspect of the present disclosure, the selected set of words is dynamically associated with the supplemental media content from at least one external source during the audio conference.

According to still another aspect of the present disclosure, public sources are dynamically searched for the supplemental media content during the audio conference.

According to another aspect of the present disclosure, the supplemental media content is dynamically retrieved from a set of sources selected prior to the audio conference.

According to yet another aspect of the present disclosure, a profile of the at least one audience member is obtained. The option to select the supplemental media content is selectively provided to the at least one audience member based on the profile. The option to select the supplemental media content is not provided to another audience member based on a profile of the other audience member. In an embodiment, the profile of the audience member is a group profile for multiple audience members.

According to still another aspect of the present disclosure, a profile of a device used by one of the at least one audience member is obtained. The option to select the supplemental media content is selectively provided to the at least one audience member based on the profile. The option to select the supplemental media content is not provided to another audience member based on a profile of the other audience member According to another aspect of the present disclosure, the selected set of words is automatically associated with the supplemental media content based on a search of external sources by an analysis engine.

According to yet another aspect of the present disclosure, the monitored speaker content is monitored at a network conference bridge over which speaker content is carried for all of the audio conference participants.

According to still another aspect of the present disclosure, the supplemental media content is associated with speaker content from the audio conference in a recording of the audio conference and made available to the at least one audience members after the recording.

According to another aspect of the present disclosure, speaker content is indexed by sets of words. External sources are searched for supplemental media content corresponding to the indexed set of words.

According to yet another aspect of the present disclosure, the supplemental media content includes Internet content corresponding to the words.

According to still another aspect of the present disclosure, the supplemental media content includes audio content from previous recordings.

According to another aspect of the present disclosure, the set of words in the speaker content is classified, and a query is formulated for supplemental media content associated with the set of words based on a classification of the set of words.

According to yet another aspect of the present disclosure, a search for supplemental media content for the selected set of words is updated. The at least one audience members is notified of an option to select updated supplemental media content associated with the selected set of words.

According to still another aspect of the present disclosure, preference input from the at least one audience member for the audio conference is accepted. The supplemental media content for which the option to select is presented to the at least one audience member is edited based on the accepted preference input.

According to another aspect of the present disclosure, the at least one audience member is grouped into multiple groups. Different options to select supplemental media content associated with the set of words are presented to the different groups based on the grouping.

According to an aspect of the present disclosure, at least one non-transitory computer readable medium stores a set of executable instructions for supplementing an audio conference based on speaker content. The set of executable instructions includes a monitoring segment that monitors speaker content from at least one of multiple audio conference participants. A selecting segment selects a set of words from the speaker content. A determining segment determines that the selected set of words is associated with supplemental media content from at least one external source. An availability making segment makes the supplemental media content available to at least one audience member for the audio conference. A selective presenting segment selectively presents the supplemental media content to the at least one audience member.

According to an aspect of the present disclosure, at least one computer supplements an audio conference based on speaker content. The at least one computer includes memory; a tangible non-transitory processor that stores a set of executable instructions for supplementing an audio conference based on speaker content; and an audio monitor that monitors speaker content from at least one of multiple audio conference participants. The executable instructions, when processed by the processor, select a set of words from the speaker content. The executable instructions, when executed by the processor, determine that the selected set of words is associated with supplemental media content from at least one external source. The supplemental media content is made available to at least one audience member for the audio conference. The supplemental media content is selectively presented to the at least one audience member.

While a computer-readable medium herein may be shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for supplementing an audio conference based on speaker content, comprising:
   monitoring, using a computer with a tangible processor and memory, speaker content from a plurality of audio conference participants;
   selecting a set of words from the speaker content;
   determining that the selected set of words is associated with supplemental media content from an external source;
   making the supplemental media content available to a first audience member of a plurality of audience members for the audio conference, based on information retrieved from a profile specific to the first audience member, and not making the supplemental media content available to a second audience member for the audio conference, based on information retrieved from a profile specific to the second audience member; and
   selectively presenting the supplemental media content to the first audience member and not to the second audience member for the audio conference.

2. The method of claim 1,
   wherein making the supplemental media content available comprises presenting an option to select the supplemental media content available to the first audience member for the audio conference, and
   wherein the supplemental media content is selectively presented to the first audience member responsive to selection of the supplemental media content by the first audience member.

3. The method of claim 2, further comprising;
   obtaining a profile of the first audience member,
   wherein the profile specific to the first audience member comprises a profile of the first audience member,
   wherein the option to select the supplemental media content is selectively provided to the first audience member based on the profile, and
   wherein the option to select the supplemental media content is not provided to the second audience member based on a profile of the second audience member.

4. The method of claim 2, further comprising:
   obtaining a profile of a device used by the first audience member,
   wherein the profile specific to the first audience member comprises a profile of the device used by the first audience member,
   wherein the option to select the supplemental media content is selectively provided to the first audience member based on the profile, and
   wherein the option to select the supplemental media content is not provided to the second audience member based on a profile of a device used by the second audience member.

5. The method of claim 2, further comprising:
   updating a search for supplemental media content for the selected set of words, and
   notifying the audience members of an option to select updated supplemental media content associated with the selected set of words.

6. The method of claim 2, further comprising:
accepting preference input from the first audience member for the audio conference; and
editing the supplemental media content for which the option to select is presented to the first audience member based on the accepted preference input.

7. The method of claim 2, further comprising:
grouping the first audience member into a plurality of groups; and
presenting different options to select supplemental media content associated with the set of words to the different groups based on the grouping.

8. The method of claim 1,
wherein the audio conference comprises a discussion at a single physical site among a plurality of individuals.

9. The method of claim 1,
wherein the supplemental media content comprises feedback accepted from one of the audience members.

10. The method of claim 1, further comprising;
accepting feedback from the first audience member,
wherein the supplemental media content is made available to the first audience member based on the feedback.

11. The method of claim 1, further comprising:
associating the selected set of words with the supplemental media content from an external source during the audio conference.

12. The method of claim 11, further comprising:
searching for the supplemental media content among public sources during the audio conference.

13. The method of claim 1,
wherein the supplemental media content is retrieved from a set of sources selected prior to the audio conference.

14. The method of claim 1,
wherein the selected set of words is automatically associated with the supplemental media content based on a search of external sources by an analysis engine.

15. The method of claim 1,
wherein the monitored speaker content is monitored at a network conference bridge over which speaker content is carried for all of the audio conference participants.

16. The method of claim 1, further comprising:
indexing speaker content by sets of words, and
searching external sources for supplemental media content corresponding to the indexed set of words.

17. The method of claim 1,
wherein the supplemental media content comprises Internet content corresponding to the words or audio content from previous recordings.

18. The method of claim 1, further comprising;
classifying the set of words in the speaker content, and
formulating a query for supplemental media content associated with the set of words based on a classification of the set of words.

19. A non-transitory computer readable medium that stores a set of executable instructions for supplementing an audio conference based on speaker content, comprising:
a monitoring segment that monitors speaker content from a plurality of audio conference participants;
a selecting segment that selects a set of words from the speaker content;
a determining segment that determines that the selected set of words is associated with supplemental media content from an external source;
an availability making segment that makes the supplemental media content available to a first audience member of a plurality of audience members for the audio conference, based on information retrieved from a profile specific to the first audience member, and not to a second audience member for the audio conference, based on information retrieved from a profile specific to the second audience member; and
a selective presenting segment that selectively presents the supplemental media content to the first audience member and not to the second audience member.

20. A computer for supplementing an audio conference based on speaker content, comprising:
memory;
a tangible processor that executes a set of executable instructions for supplementing an audio conference based on speaker content;
an audio monitor that monitors speaker content from a plurality of audio conference participants,
wherein the executable instructions, when processed by the processor, select a set of words from the speaker content,
wherein the executable instructions, when executed by the processor, determine that the selected set of words is associated with supplemental media content from an external source;
wherein the supplemental media content is made available to a first audience member of a plurality of audience members for the audio conference, based on information retrieved from a profile specific to the first audience member, and not to a second audience member for the audio conference, based on information retrieved from a profile specific to the second audience member; and
wherein the supplemental media content is selectively presented to the first audience member and not to the second audience member.

* * * * *